Figure 9:
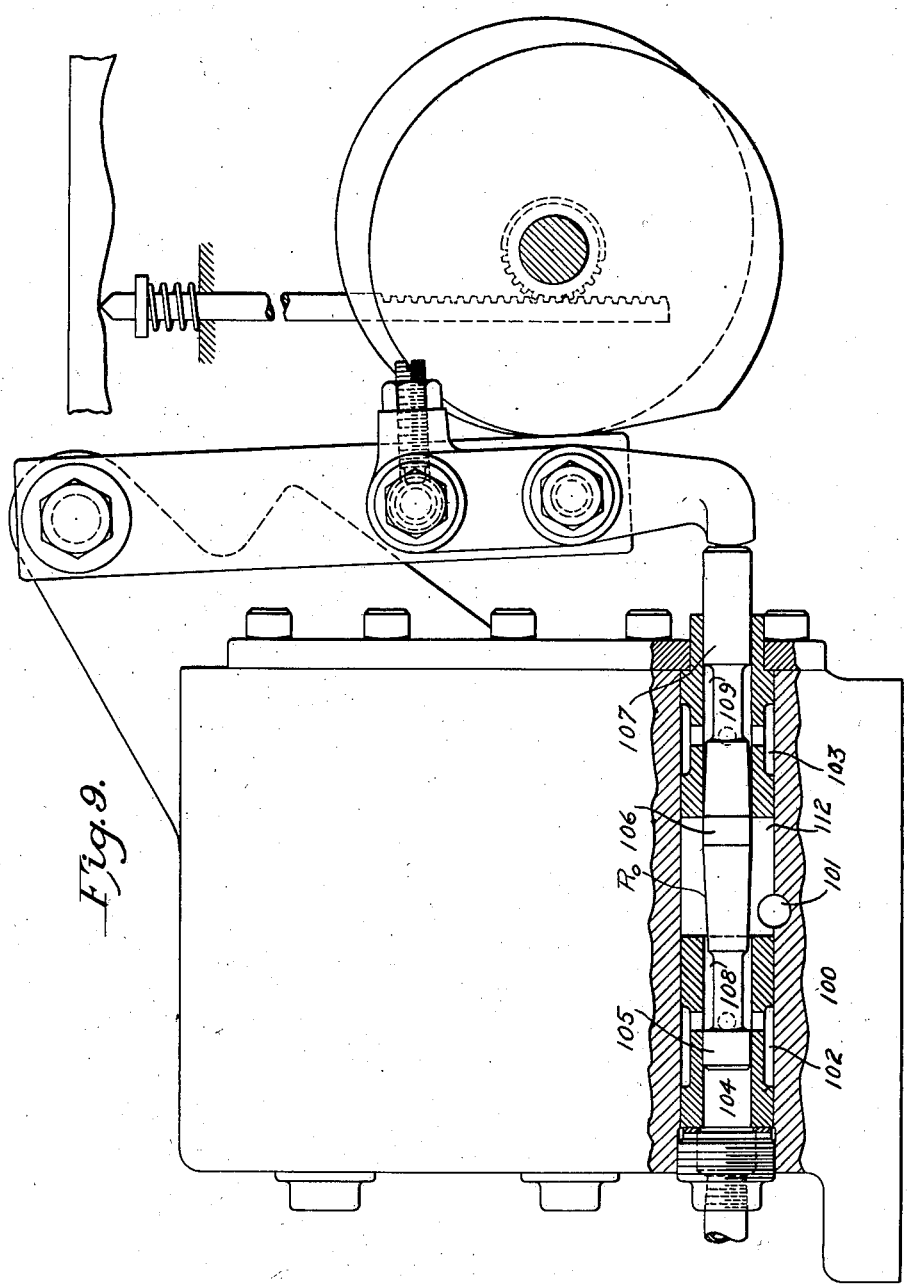

June 25, 1935.   H. ERNST ET AL   2,005,732
BALANCED PRESSURE HYDRAULIC CIRCUIT
Filed Oct. 21, 1930   10 Sheets-Sheet 1
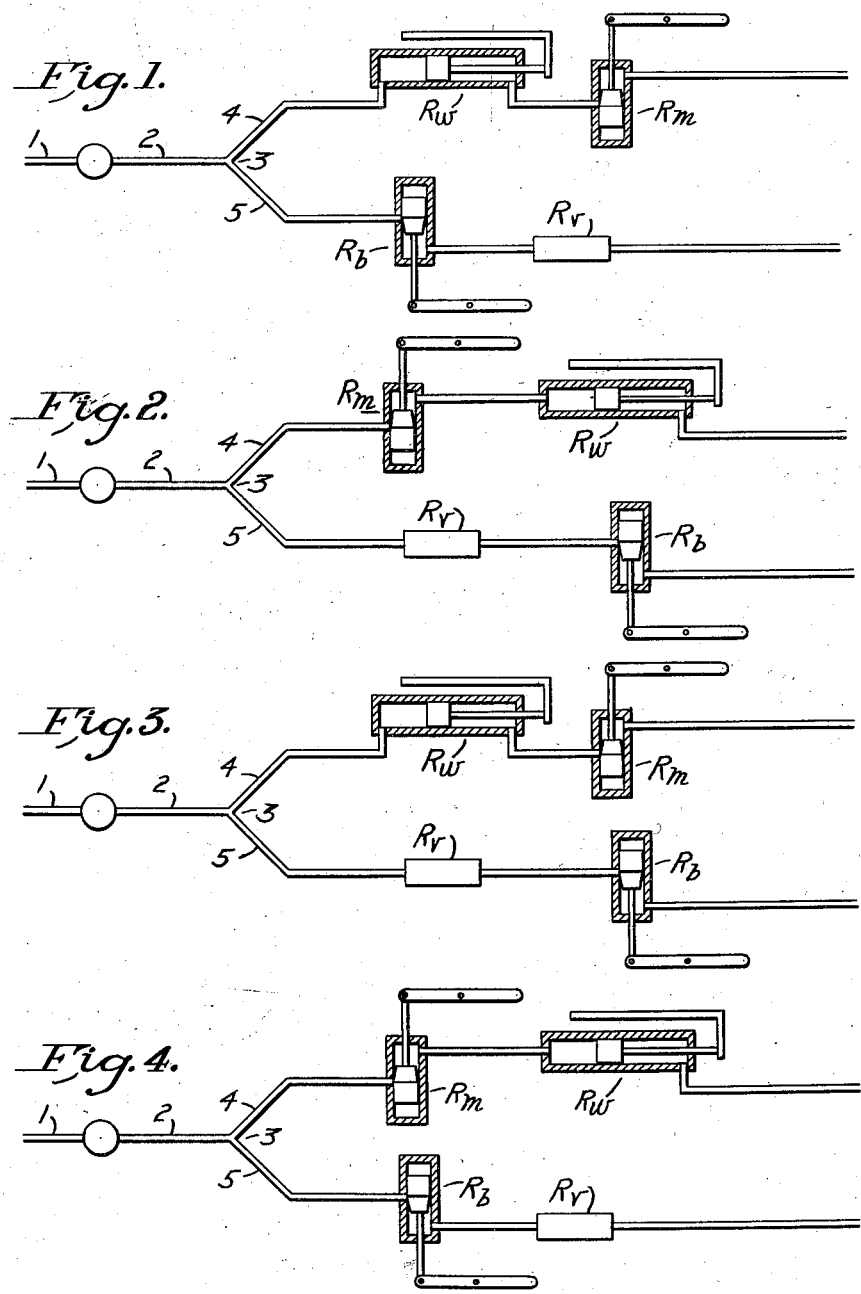

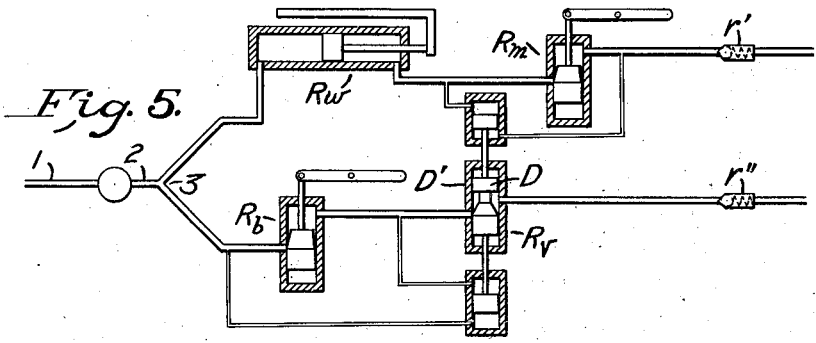
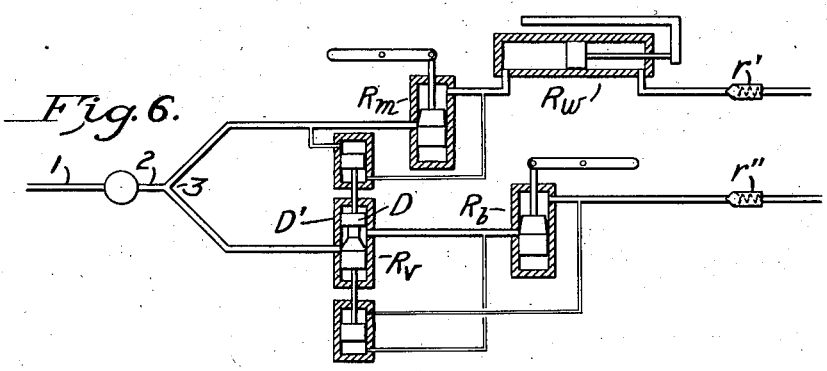
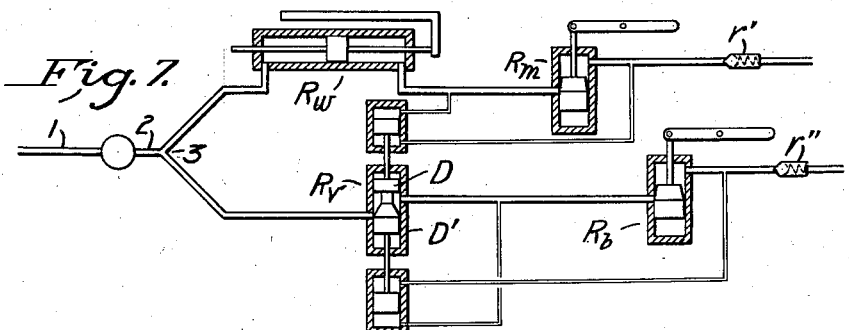
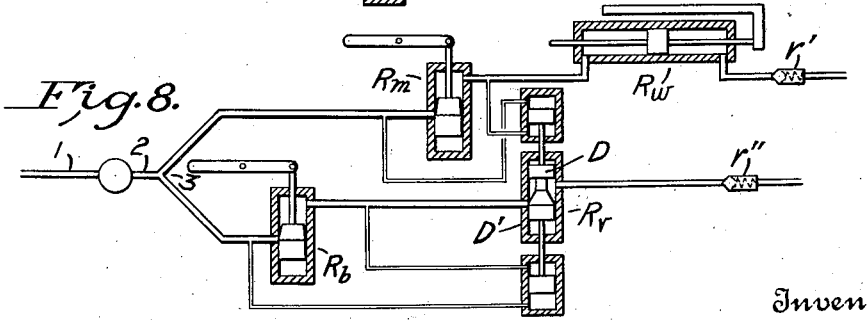

June 25, 1935.   H. ERNST ET AL   2,005,732
BALANCED PRESSURE HYDRAULIC CIRCUIT
Filed Oct. 21, 1930   10 Sheets-Sheet 3

Inventors
Hans Ernst
Bernard Sassen
By Attorneys
Nathan & Bowman

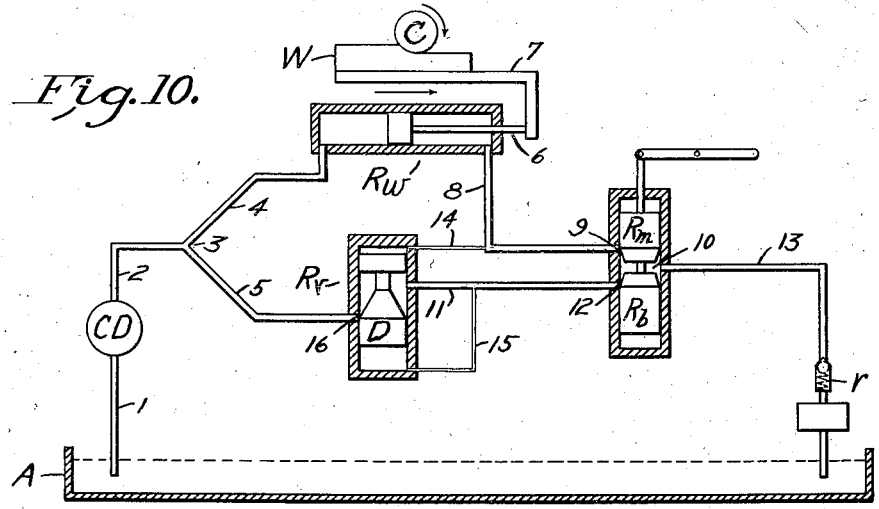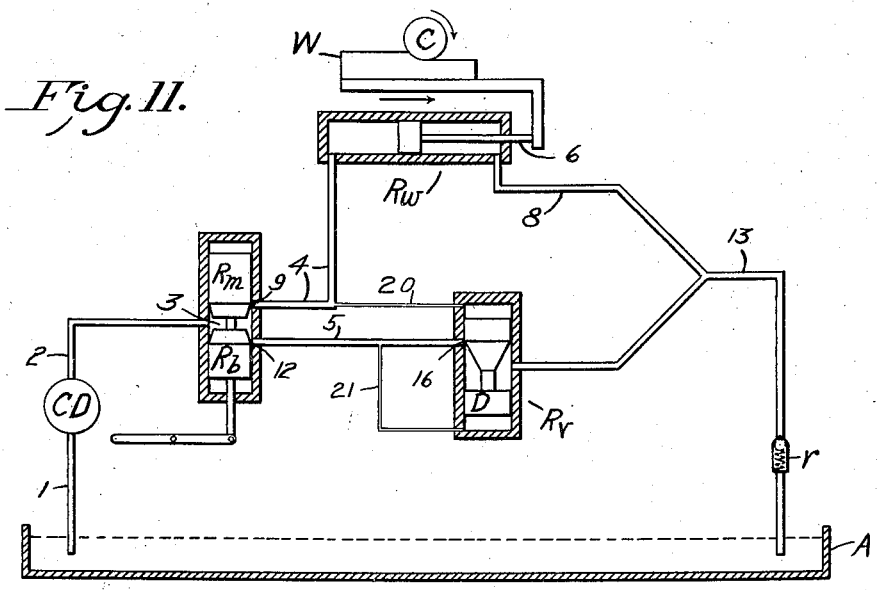

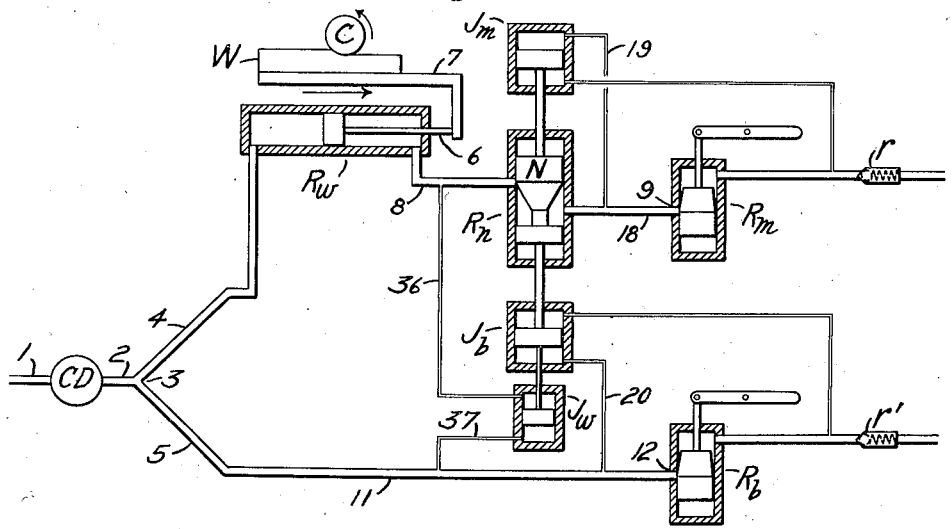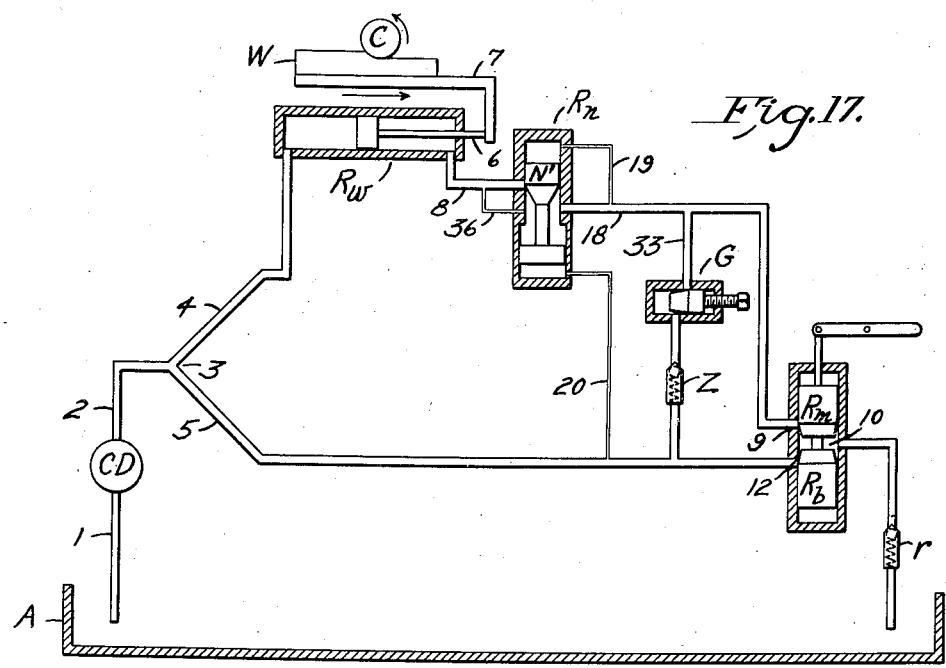

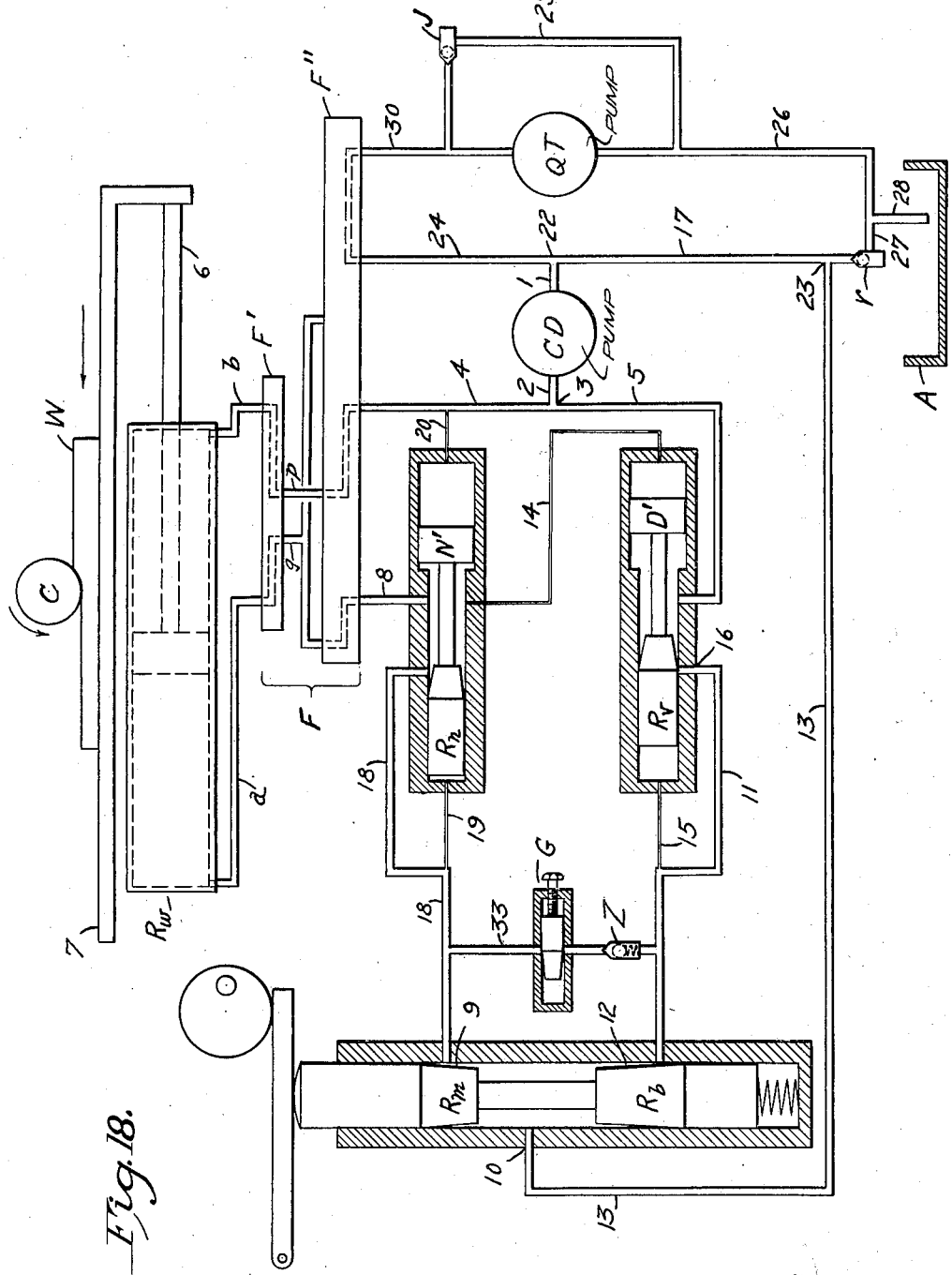

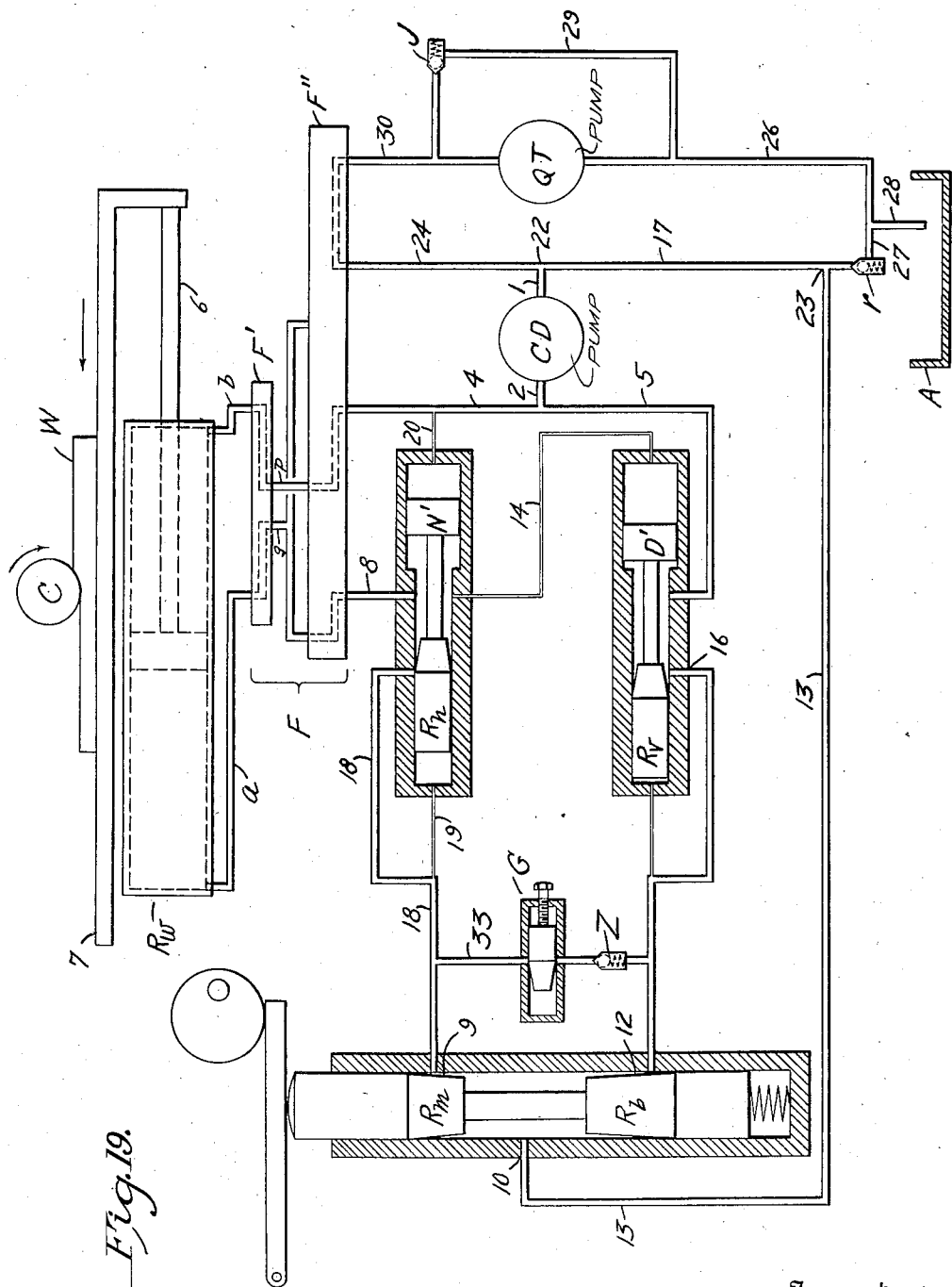

Patented June 25, 1935

2,005,732

UNITED STATES PATENT OFFICE 2,005,732

BALANCED PRESSURE HYDRAULIC CIRCUIT

Hans Ernst and Bernard Sassen, Cincinnati, Ohio, assignors to The Cincinnati Milling Machine Company, Cincinnati, Ohio, a corporation of Ohio Application October 21, 1930, Serial No. 490,154

14 Claims. (Cl. 60—52)

This invention deals with hydraulic systems and it is concerned with the proposition of dividing a main flow from a given source into a plurality of component flows each definitely and automatically maintained at a volumetrically-constant predetermined ratio to the other regardless of variations in viscosity or work resistance. It is further concerned with additional improvements in the nature of refinements in the regulating means whereby the fraction effectively available for motor actuation may be maintained in correspondence with throttle readings despite the leakage unavoidable in any system. And it is still further concerned with the provision, in such systems, of means, preferably manual, for selectively fixing or setting the division of flow whereby the fraction of such flow effectively available for motor actuation will thereafter be automatically held constant within very close limits.

If derived from a constant-pressure source, the amount of oil flowing through a given line (should there be no branch line or leakage) will be some function of the value of a given resistance in that line. Since the initial pressure is, in this case assumed to be constant, the rate of flow will vary in some inverse relation to the resistance. Should that resistance be variable, as in the case of a motor subject to variations in work resistance (in the absence of auxiliary regulation) the speed of the motor will slow down as the work resistance increases. For a given invariable work resistance, the motor may be caused, in this special case, to run at a selected speed by introducing an adjustable resistance (a throttle) set at an appropriate value, but if the work resistance now change, as it usually does in practice, then will the speed of the motor likewise change.

But, if derived from a definitely constant-volume source, the pressures in the line (again assuming no division of flow) will vary but not the rate. As the rate of flow does not vary, the speed of the motor will be unchanged regardless of variations in work resistance. But in practice, a single rate motor would not satisfy the requirements of the user who desires a selection of rates.

In this second case, the mere introduction of a throttle in the line will not suffice to determine the speed of the motor, but some means must be provided for diverting a definite amount of the oil from the motor, as by a diversion to waste or to a reservoir; either under pressure or not. But this, in turn, demands regulation either directly or indirectly, and such regulation has heretofore been difficult to attain.

The difficulties deemed inherent in such regulation have caused many designers in the art to resort to undivided lines and to contrive costly variable displacement pumps in the expectation of adjusting the pump to deliver oil at whatever volumetrically constant rate may be desired at the ultimate station, but, apart from the cost of an adjustable pump, other troubles exist, such as leakage (slippage) in the pump itself, also in the conduit system, and finally in the hydraulically-propelled motor. Also may be mentioned the difficulty that the work resistance may be positive or negative according to conditions of usage.

One cause of non-uniformity in the performance of a conventional hydraulic system of the throttle type is that the medium employed at one time may be unlike that employed at another, i. e. its viscosity may appreciably change during usage, or be materially different with different oils. As flows are dependent upon the resistance encountered (usually in the form of a restricted orifice) and as a thin oil will, by a given orificial restriction, be impeded less in flow than a thick oil, it is manifest that the rate will suffer variation and should, in some manner or other, be compensated for to meet different conditions of viscosity.

This invention, however, now proposes a new approach at the problem whereby, starting with any source, the flow may, under easy and accurate control, be divided into two fractions; one of which will be taken to the point of usage and the other by-passed back to a reservoir for re-pumping. In this system there is a unique and mutual control over each fraction such that the one is balanced against the other. This system is furthermore so constituted as to be remarkably amenable to compensation for viscosity, for leakage, and for variations in work resistance; and readily adjustable to yield any selected rate of flow in its work-branch. How these and further objectives are attained can best be progressively explained with the aid of analytical diagrams indicating the fundamentals together with diagrammatic drawings representing how the systems admit of being embodied in a practical way.

Figure 12:
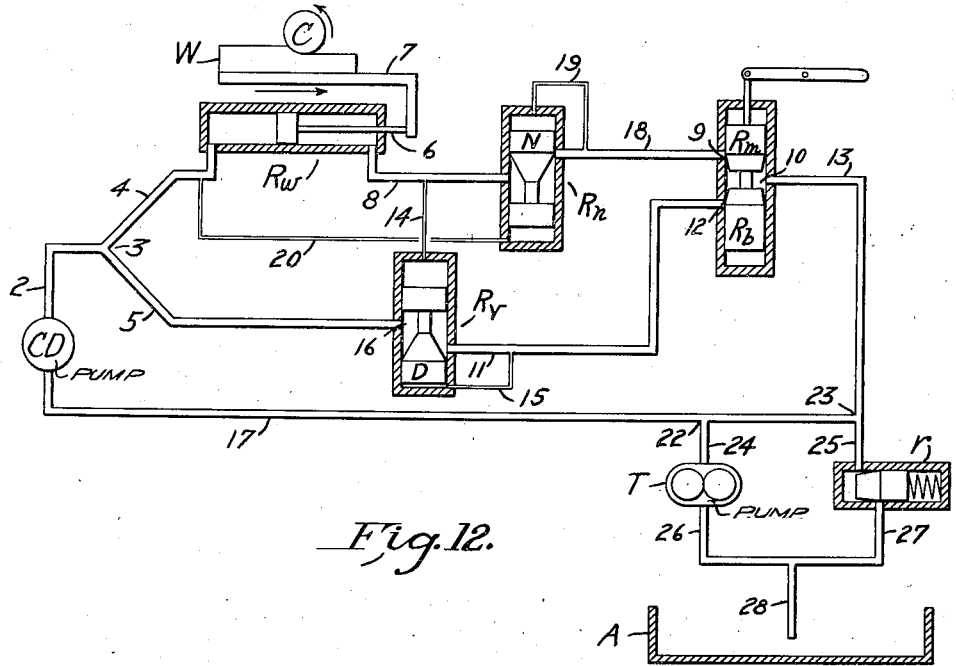
Figure 13:
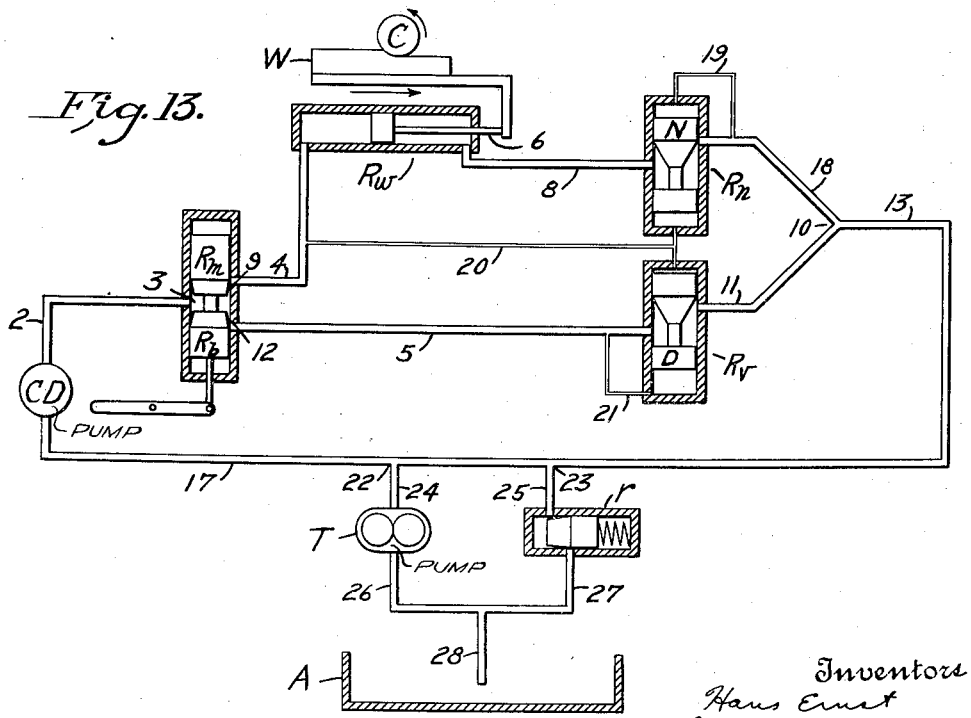
Figure 14:
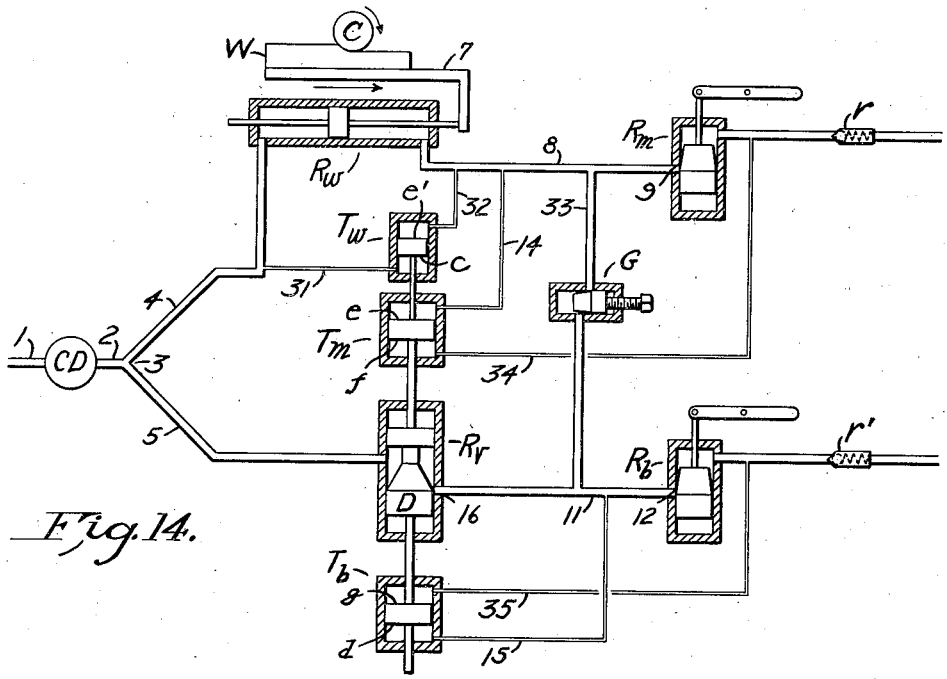
Figure 15:
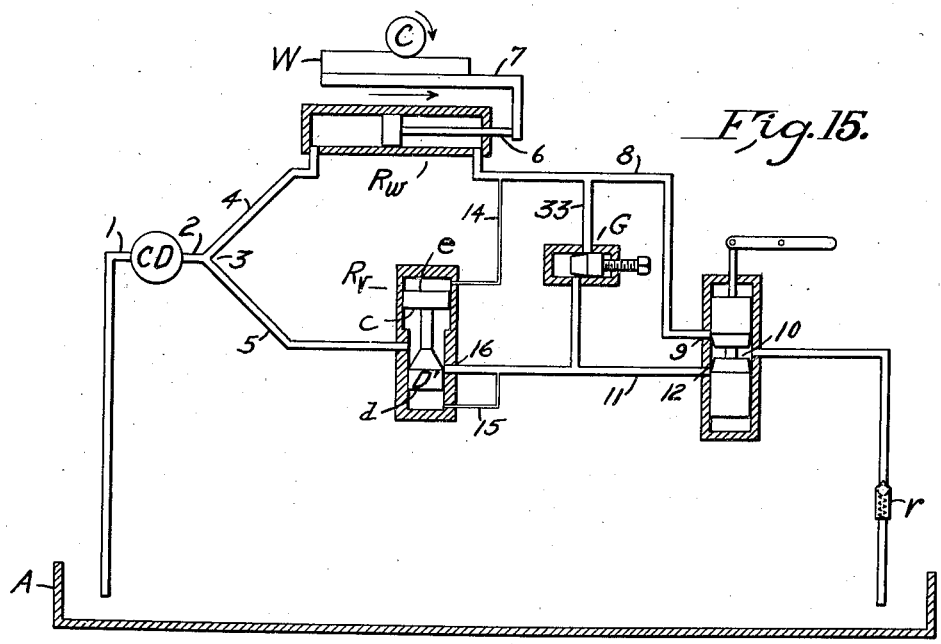
Figure 20:
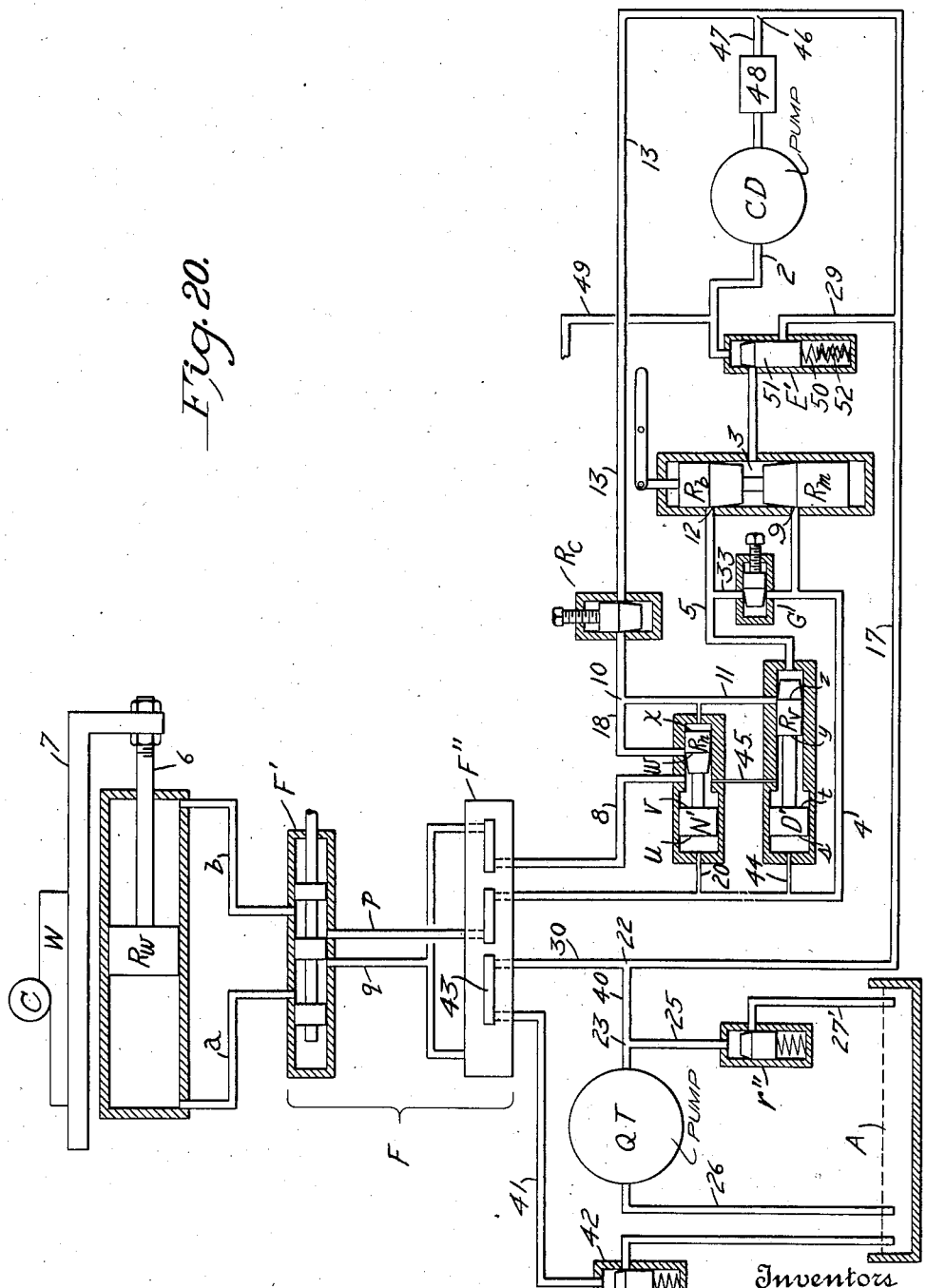

Figures 1, 2, 3 and 4 are diagrams illustrating basic arrangements of the invention. Figs. 5, 6, 7 and 8 are analytical drawings similar to Figs. 1, 2, 3 and 4 supplemented however by an illustration of means for producing and maintaining equal pressure differences across both the series and parallel resistances of the circuit. Fig. 9 is a view illustrating structural details of the throttle valve and means for operating it. Figs. 10 and 11 are diagrams of the circuit similar to Figs. 7 and 8 reduced to their simpler equivalents, Fig. 11 illustrating a flow reverse to that in Fig. 10. Figs. 12 and 13 are diagrams of the arrangement of the parts under a negative work resistance, Fig. 12 illustrating the throttle behind the motor and Fig. 13 illustrating the throttle ahead of the motor. Fig. 14 is an analytical diagram illustrating a method of compensating for leakages when the work resistance is positive. Fig. 15 is a diagram similar to Fig. 14 but reduced to simpler form. Fig. 16 is an analytical diagram of a method for compensating for leakages under a negative cut. Fig. 17 is a reduction of Fig. 16. Figs. 18 and 19 illustrate the structural arrangement of the parts under positive and negative work resistances respectively. Fig. 20 is a diagram illustrating a preferred system for milling machine usage and embodying additional improvements.

Heretofore, so far as we are aware, the precise, or at least any simple workable relation between viscosity and resistance, has remained unknown to those undertaking to contrive oil-transmissions, and this ambiguity has still further obscured the general problem. But, as a result of a series of careful laboratory experiments, we have discovered that any orificial or frictional resistance will, in the case of oil, vary with temperature directly as the Saybolt measure of its viscosity varies with the temperature, and also that the resistance will remain approximately constant for any given temperature regardless of variations in pressure or rate of flow. So, if Q be the quantity or rate of displacement, and P be the drop in pressure across a given resistance R, then will $P = QR$.

This observation (in connection with further studies) has led us to the fundamental proposition that the division of flow may be held in a definite ratio, regardless of variations in work resistance or viscosity, by an arrangement providing a first resistance in series with the work resistance, a second resistance in parallel with the work resistance, supplemented by any means adequate to produce and maintain equal pressure-differences across both the series and the parallel resistances. As will later be seen, if the pressure differences across both the series and the parallel resistances (throttles) are maintained equal, and since the total pressure difference (from pump to return line) is the same for each line, then the pressure drop across the motor must at all times remain equal to the pressure drop across the balancing valves. But, to avoid any misleading deduction, it is here remarked that this does not mean that their respective resistances are equal.

For the pressure-equalizing means or resistance variator of the foregoing combination, this invention proposes a valve in the nature of an automatically operated throttle located in parallel with the work resistance if it be positive in effect, or in series with the work resistance if it be negative in effect. In the former case, the motor is used to overcome the work resistance; in the latter, as a brake, to resist it.

Those versed in machine tools, the art to which this invention is more especially addressed, will readily appreciate the significance of a positive or a negative work resistance, but for the benefit of those who happen not to know, reference will be made to a milling-machine in which it is usual to rotate the cutter so that its teeth enter the work in a direction opposite to that of its travel, and in this case the work resistance or effect of the tooth is positive and tends to retard the travel of the table. On other occasions, the cutter is rotated conversely so that its teeth enter the work in the direction of its travel; making a so-called "hook-in" cut. Here the operation tends to accelerate the travel of the table, and the work resistance acts negatively.

Fixing attention, for the present, solely upon the usage of a positive work resistance, and regarding the pressure-balancing means as a variable resistance, as also is the work resistance, and remarking that either or both of the other two resistances may be "selective", our fundamental rule of arrangement creates a "balanced" family of four combinations. Of these, two are symmetrical, and two are asymmetrical. Insofar as compensation for changes in viscosity and changes in work resistance are concerned, either of these is quite available. Furthermore, as will be shown later, either of the symmetricals, but not so readily the asymmetricals, are compatible with a very simple means for compensating for leakage which we have succeeded in developing as an extension of the basic combination and arrangement characterizing the broader aspects of this invention. This special or auxiliary combination can best be discussed later. While this is preferred by reason of its simplicity, compensation for leakage in any of these four arrangements may be accomplished by resorting to certain of the expedients disclosed in an application Serial No. 561,900 and filed September 9, 1931.

For the sake of present simplicity, it may be assumed for the present that the motor is of the non-differential type which, in usual practice takes form as a piston having its rod extending through both ends of the cylinder and hence occupying both chambers. In this case, the basic diagrams Figs. 3 and Figs. 4 differ only in respect to the direction of entry of the oil; and the same applies to Figs. 1 and 2. But, engineering considerations lead to a preference, in actual practice, for a motor of the differential type where the piston rod extends through but one end of the cylinder. In this case the ratio of flow through the two throttles depends upon the direction of flow into the motor. If the total amount received from the pump be $Q_0$, and the feed rate be F, and the areas of the large and small sides of the piston be $A_1$ and $A_2$ respectively, then:— In Fig. 3, if it first enters the large end of the cylinder and the outgoing oil from the small end passes the throttle, the ratio will be $$\frac{Q_0 - FA_1}{FA_2},$$

and $$\frac{Q_0 - FA_2}{FA_1}$$

if it first enters the small end of the cylinder and the outgoing oil from the large end passes the throttle. These represent feeds to the right and left when the motor itself is reversed. In Fig. 4, if the flow first passes the throttle and then enters the large end of the cylinder, the throttle ratio will be $$\frac{Q_0 - FA_1}{FA_1}$$

and $$\frac{Q_0 - FA_2}{FA_2}$$

if it first passes the throttle and then enters the small end of the cylinder.

Thus for the same throttle setting, the difference in feed rate for the two directions of piston movement will be considerably less with the arrangement of Fig. 3 than with the arrangement of Fig. 4.

Referring now to Figs. 1, 2, 3 and 4, which diagrammatically depict this family of combinations, $R_m$ and $R_b$ represent definite resistances in the main and branch lines respectively. $R_w$ represents the work resistance which may vary (being in practice a motor subject to variable loads) and $R_v$ represents a resistance which varies to assume different values as the work resistance varies, but not in any relation solely dependent upon the work resistance. Either one or both of the resistances $R_m$ and $R_b$ are to be regarded as "selective" to wit, capable of being manually set at any arbitrary value for the purpose of fixing the rate of flow which is, through the co-operating action of the variator $R_v$ held uniformly at the rate so selected.

To do this, the variator $R_v$ must so act as at all times to balance the variations in the work-resistance $R_w$, i. e. the pressure-drop across the one must always equal the pressure-drop across the other for any given setting of the throttles $R_m$ and/or $R_b$. But, of course, any other setting of the throttles will produce some other pressure-drop in the motor which again the variator must be on the alert always to balance.

The direct function of the variator $R_v$ is to regulate the flow through the shunt or branch line and to that end it is represented as a valve proper such, for example, as a plunger D within a casing D' through which any flow in the branch line must pass, according to the position occupied by that plunger, as will be understood from Fig. 5 which shows a more detailed development of Fig. 1.

Its position is in turn determined, in accordance with the rule prescribed, mutually by the pressure differentials of the set resistances $R_m$ and $R_b$, either or both of which may be throttles. To do this a pair of pistons and cylinders are shown; each mechanically connected to the plunger D. Pressure lines from across the shunt resistance $R_b$ lead to the one piston and cylinder and are so connected that the pressure differential thus derived from the shunt throttle tends to close the valve and choke the flow through the variator. Other pressure lines from across the series resistance $R_m$ lead to the other piston and cylinder and are so connected that the pressure differential derived from the latter tends to open the valve and expedite the flow through the branch line.

The variator will be in equilibrium only when the pair of differentials are balanced and equal. Should either differential become changed (as when an increase in the work resistance decreases the differential across the throttle $R_m$) then will the valve take a new position (in this case towards closure) such that the differentials will again be equalized; the main line differential being the controlling and the shunt line differential being the controlled. Consequently, the division of flow is held invariable, and the feed rate of the motor is maintained constant insofar as the flow from the source is constant.

It is to be noted that, by this arrangement, the variator automatically functions to maintain at all times (again assuming a constant supply from the source) equal pressure drops across itself and the motor to meet all such variations in the work resistance as may arise. The total pressure drop is thus identical in both the main and the shunt line, and the ratio of the quantity flowing through each remains constant. That ratio is, of course, predetermined by the setting of either or both of the throttles $R_m$ and/or $R_b$; the greater fraction flowing through the branch line for low feed rates, and conversely.

That the total pressure-drop should be the same in each line may seem paradoxical unless it be kept in mind that pressure differentials are functions of the quantity flowing and that, according to our experiments hereinbefore mentioned, a resistance will remain constant regardless of variations in pressure or rate of flow of oil at any given temperature. Consequently, if the quantity from the source be represented by Q, and R and R' the total resistance of each line, then their respective conductances will be $1/R$ and $1/R'$ and the quantities flowing through each will be $QR'/R+R'$ for the first and $QR/R+R'$ for the second line. The pressure drop in the one line will be quantity times resistance or $QR'R/R+R'$ and in the other line $QRR'/R+R'$ which will be seen to be equal, as before stated.

The asymmetrical arrangement of Fig. 2 admits of a similar type of variator, as shown in more detail by Fig. 6. Here the main line throttle $R_m$ precedes the motor in series, and the branch line throttle $R_b$ is subsequent to the variator. The differential of the former endeavors to open the variator, and is balanced by the differential of the latter which seeks to close it.

For the sake of clearness in understanding, in each of the above mentioned figures, the two differential actuators for the balanced valve of the variator have been illustrated as individually distinct elements. But, from the standpoint of practical installation, these elements will (insofar as they permit) be merged together, and pairs of the pressure-transmitting lines will be reduced to single lines whenever they serve to convey a common pressure.

To explain:—the discharge lines in Figs. 5–8 are each indicated with a nominal resistance $r'$ and $r''$ because, in practice, it is advisable to use a low pressure relief-valve to keep the system full of oil, and these lines (main and shunt) which usually lead to a reservoir for re-pumping, will ordinarily merge and continue as a single discharge line leading to the reservoir through a single relief valve. In this case $r'=r''$ and their pressures will, accordingly be equal. This common discharge pressure, when both applied plus and minus to the variator (as in Fig. 7) will therefore cancel in effect, and may therefore be actually disregarded and the piston areas through which they are applied may be omitted.

So also, as in the case of Fig. 8, the pressures ahead of the set-resistances in the main and shunt lines will, for a like reason, cancel in effect and may therefore be actually disregarded in a practical installation for the sake of simplicity.

A further improvement of these elementary systems has been conceived by us, and may at this point be introduced; to wit, instead of merely using two set-resistances, either one or both arranged for independent adjustment for the purpose of determining the feed-rate, it is proposed that they shall be dependently settable in a converse way. That is to say, they are both adjustable by a single hand-grasp; the one increasing while the other decreases, and conversely. This arrangement is highly desirable from a practical standpoint for various reasons, such as extending the range within a maximum pressure at any point in the system, and in avoiding any necessity for severe pressures for a given range of feed selection.

In practice, this special type of selective resistance will take form as a sort of three-way valve or throttle. A form of construction well suitable for the purpose is shown by Fig. 9 in which 100 is a casing providing a combined-flow port 101 and two fractional-flow ports 102 and 103. The combined-flow port may be the inlet or the outlet, according to whether the device controls delivery of oil to the motor (as in Fig. 11) or controls the discharge from the motor, as in Fig. 10. These ports open into a bore 104 and therein fits a valve-element in the nature of a piston $R_o$ having three heads, 105, 106, and 107 closely fitting the bore and separated by reduced oil-ways 108 and 109. The center head 106 extends in converse tapered portions which, by their positions, determine the sizes of the passageways from the oil-ways 108 and 109 to the annular oil-way 112 in the casing and which communicates at all times with the port 101.

One end of the piston extends externally of the casing to provide an operating element which is mechanically connected in some appropriate manner with a lever adapted to be moved manually or by a conventional trip dog or cam, as the case may be, to select the feed rate.

Having regard for all of the foregoing considerations, the systems of Figs. 7 and 8 may be reduced to their simpler equivalents depicted by Figs. 10 and 11 which admit of being compactly embodied in any type of machine tool and especially in a milling machine devoted to cutting against the feed, and will automatically compensate for viscosity changes because any change in the resistance of the throttle element $R_m$, due to a change in the viscosity, will be balanced by a proportionate change in the resistance of $R_b$. For the sake of clearness, in describing these and further refinements thereof, the oil will be assumed to be derived from a constant-volume source such as a rotary motor-driven pump C D built on or into the machine. Such pumps, being of very simple construction and well known, need no description. It derives its supply from the oil returned by the motor, either entirely from the reservoir as shown by these figures, or chiefly from the return line supplemented, when need be, by additions from the reservoir as will be seen in connection with the rapid-traverse arrangement to be later described.

Referring to Fig. 10, the oil from the reservoir A is drawn through the pipe 1 by the pump C D and delivered into the pipe 2 and flows to the junction 3 and then divides in accordance with the then-existing throttle-setting and in part enters the main-line pipe 4 and in remainder enters the shunt-line pipe 5. The motor is in general designated $R_w$ to signify a variable work resistance which has to be overcome by the fraction of oil flowing through the main-line. In practice this motor will usually take form as a simple piston-and-cylinder with its piston-rod 6 mechanically connected (in a milling machine) to a reciprocable table 7 on which the work piece W is mounted within the tooling zone of a rotary cutter C which, in the present instance, is being driven in the direction indicated by the curved arrow; to wit, against the feed which proceeds as indicated by the straight arrow.

The oil discharged by the motor $R_w$ enters the pipe 8 and forces its way through the adjusted resistance $R_m$ and thence through the passage 9 of the throttle to the junction 10. The oil entering the shunt-line passes through the variator designated $R_v$ and then through the pipe 11, past the branch-line resistance $R_b$ and through the passage 12 to the junction 10. The two fractions, at this point merge and together enter the discharge line 13 and flow through the fixed resistance $r$ (a simple relief valve) and into the reservoir.

Pressure lines 14 and 15 transmit opposing hydraulic pressures to the opposite end-areas of the differential plunger D so that when the resultant mechanical forces are unequal, the plunger will be shifted by the preponderating force to enlarge or restrict the orifice 16 until a position of equilibrium is attained. If the opposing end-areas are made equal, then must the hydraulic pressure in the line 11 be maintained equal to that in the line 8. In other words, howsoever the work resistance may vary (in a positive way) the variator will ensure that oil in each line meets its throttle resistance $R_m$ and $R_b$ under equal pressures however much the hydraulic pressure behind the motor varies in consequence of the resistance offered by the tooling operation.

Accordingly, the fractions into which the flow is divided by any setting whatsoever of the feed-determining throttle is a result of the rule we have established. Should the temperature now change to make the oil more or less viscous, then will the throttle resistances to the flow likewise change, but in like proportion; the one becoming $kR_m$ and the other $kR_b$ and their ratio remains $R_m/R_b$ as before and the division of flow is unaffected. In short, the volume utilized to propel the motor suffers no alteration, and the feed rate is unaffected by viscosity variations.

The same advantages inhere to the arrangement of Fig. 11 in which the flow is reversed. Here, as before, the pressure lines to the variator carry to it the pressures on one side of the throttle resistances and cause the variator to maintain them equal so that the drop across one leg of the throttle will always (for any given setting) be in the same ratio to the drop across the other leg irrespective of variations in either work resistance or viscosity.

But, what has been said about Figs. 10 and 11, would not apply in the event of a negative work resistance, nevertheless, the basic arrangement of this system has enabled us to meet that contingency alone; or automatically for either a positive or a negative work resistance. How this has been done is represented by Figs. 12 and 13. The cutter, in these cases, is being rotated not against the feed as before but now with the feed. When taking a cut requiring a cutting pressure in excess of the normal friction of the table and associated elements, the cutter will have the effect of propelling the table faster than the selected feed rate and, unless this effect was nullified, a jamb would result. This advancing urge is herein referred to as a negative work resistance.

In Fig. 12, the constant-volume pump C D derives its supply, not directly from the reservoir but from the return line; the reservoir A being not in series but in parallel. The system is kept full by a make-up pump T which draws from the reservoir A and discharges into the return-line. A simple relief valve $r$ serves to permit the excess oil to return to the reservoir and, at the same time, maintains a constant back-pressure in the system. The pump out-put enters the pipe 2 and at the junction 3 divides into the two fractions definitely determined by the setting of the throttle (resistances $R_m$ and $R_b$) and the one fraction goes to the motor through the pipe 4 and propels it at the predetermined feed-rate; the other entering the shunt line 5 and passing the variator $R_v$ which, it may be mentioned, remains wide-open (as shown) and without function when (but only when) the machine is used to take hook-in cuts yielding a negative work resistance. The same is true cf Fig. 13. But it resumes its function, as previously described, whenever the machine is set to take upward-cuts.

The cutter C is seeking to over-run the motor and it is now necessary to use the latter as a brake without changing the setting of the throttle resistance $R_m$. An extra variable resistance or variator must be interposed between the motor and throttle resistance and automatically adjusted to maintain equal pressure differentials across the two resistances in parallel ($R_m$ and $R_b$) and this is done by a differential valve $R_n$ subjected to the opposing influences of the pressures at those resistances respectively. A pressure line 19 taking off the pipe 18, and another 20 taking off the pipe 4, serve that office; it being noted that the pressure ahead of the motor is identical with that in the line 11 due to the fact that the alternatively available variator $R_v$ is now wide-open because the negative work resistance always creates a back-pressure higher than the forward pressure and this back-pressure, through the pressure line 14, overcomes the pressure derived through the line 15.

Should the motor momentarily exceed its selected feed-rate, the pressure in the lines 18 and 19 will increase and overcome that in the lines 4 and 20. The plunger N will hence be shifted towards closure, and the balance will at once be restored by interposing a greater back-pressure in the line 8 and keeping that in the line 18 equal to that in the line 11. This will compel the fraction passing the resistance $R_m$ to remain in constant ratio to that passing the resistance $R_b$, and the feed rate will correspond to the position of the throttle which discharges against the constant pressure in line 13.

Should the oil undergo a change in viscosity, the resistances $R_m$ and $R_b$ will each become greater or less, as the case may be, but their ratio will remain constant and the division of flow will remain in constant ratio. Hence the fraction utilized to propel the motor will remain constant and, accordingly, the feed rate, In Fig. 13, where the throttle is ahead of the motor, it receives at 3 the out-put of the C D motor through pipe 2 and divides it into two fractions: the one going through leg 9 to and through the resistance $R_m$, and the other through leg 12 to and through the resistance $R_b$. For the potential drops across these to remain equal, and hence the fractions in constant ratio, the pressure in lines 4 and 5 must remain equal. But the pressure in line 5 is itself constant (by the relief valve $r$) so that in line 4 is to be held constant and equal to that in the lines 5, 11, 18, 13 and 17.

This means that the discharge from the motor (through the back-pressure line 8) must be regulated accordingly, and this is done by the compensating resistance $R_n$; the plunger N of which being regulated in position by balancing the pressure in line 4 (through 20) against the pressure in line 18 (through 19) and thus regulating the escape from pipe 8 so that, irrespective of the magnitude of the urge by the cutter C, the forward pressure on the motor will remain constant.

From what has already been explained, it will be seen that changes in viscosity do not alter the ratio of the resistances $R_m$ and $R_b$ and hence do not disturb the division of flow and consequently not the feed-rate.

*Compensation for leakage*

Where great exactitude in adherence to predetermined feed rates is required, which is true especially of milling machines, the leakage inevitable in any system needs to be compensated for and the herein described system is peculiarly amenable, in a very simple and practicable way, to so doing. This leakage assumes several aspects; slippage of the pump, slippage past the motor, and also general leakage in the system, especially from the flow-switching valve-means (which will be referred to later) directly to the reservoir.

Assume that the C D pump is not (by reason of slippage) delivering its full complement of oil, and hence that the fraction sent to the motor by the setting of the throttle is not quite sufficient to produce the expected feed-rate. Now, by slightly over-shifting the throttle, the user could nevertheless attain the desired feed-rate. If also a certain quantity of oil leaked out of the selector valve means (which would also reduce the feed-rate) the user could, by further opening the throttle, bring the feed rate up to that wanted. Still further, should there be slippage past the motor, a further corresponding opening of the throttle would restore the feed rate to the expected normal. But the amount of slippage or leakage, in each case, is dependent upon the pressure difference producing the leakage, and the temperature of the oil; consequently the throttle readings would have to be re-calibrated for each condition of temperature and pressure. Furthermore a throttle properly calibrated for one machine would be incorrect if applied to a "duplicate" machine. For, in the commercial production of a series of machines, no two can be made exactly alike however much care be exercised, and it would be too costly and irksome to attempt to calibrate the throttle of each machine. Furthermore, by reason of wear and usage, it must be expected that the leakage constants of each machine must gradually undergo change.

So it is highly desirable, if not essential from the standpoint of practicable accuracy, that there be embodied in each machine some comparatively simple means for adjusting it to eliminate the effect, within reasonable limits, of its normal and inevitable leakage.

In this invention, therefore, we propose to compensate for leakage, not by a corresponding over-setting of the throttle, but by so modifying the normal fractional division of flow in accordance with pressure changes, that the quantity effectively available for motor propulsion will remain constant, regardless of pump, valve, and motor leakage.

A simple method of accomplishing this result is to so construct the resistance variator, that it takes on the added function of a leakage compensator. Thus, instead of balancing the throttle differentials as heretofore described, it may be arranged to provide unequal differentials, the difference between them being directly proportional to the work resistance, and therefore to the total leakage. For any throttle setting, the rate of flow through each throttle element is proportional to its pressure differential, consequently, by introducing an inequality in these differentials proportionate to leakage, the fractional division of flow may be so modified as to completely counteract the leakage effect.

How this may be done for a positive work resistance appears from Fig. 14 which corresponds to the analytical diagram of Fig. 7; the new elements being added to the combination. An additional differential actuator for plunger D is indicated by $T_w$ and imposes upon it a force-urge derived from the differential of the pressures (ahead and behind the motor) conveyed to it by the pressure lines 31 and 32. Thus instead of the throttle differentials being balanced, they will differ by an amount proportionate to the work resistance. In this illustration, the corresponding end-areas of the pistons of the two actuators $T_m$ and $T_b$ are respectively equal and, if represented by B, the area of the third actuator $T_w$ will be KB; where K is a relatively small constant varying in value according to the type and mechanical characteristics of the machine tool embodying this invention. In the case of a milling machine, if $R_p$ be the slippage-resistance of the pump employed, and $R_b$ be the resistance of the branch-line throttle for the maximum feed-rate, then for the constant K, a value satisfactory for the feed-range would be $$\frac{R_b}{R_p}$$

but, of course, this is arbitrary and subject to personal selection, and not mandatory.

In considering more particularly the effect of motor leakage, it will be seen that if a value has been assigned to K such as to completely counteract the effect of all leakage, and thus produce the set feed-rate, then the quantity flowing through the motor throttle $R_m$, will be the normal displacement of the piston, augmented by the motor leakage. On the other hand, the quantity normally flowing through the branch throttle, will be decreased by the amount diverted to the motor to counteract the total leakage effect.

Now since the pressure differential across both these throttles is a direct function of the flow through them, the effect of motor leakage will be to increase the differential across the motor throttle, and, together with the pump and valve leakage, to decrease the differential across the branch throttle. But any change in these differentials will in turn effect the action of the variator $R_v$, so that the value selected for the factor K, must take into account the effect of motor leakage on the motor throttle.

In order to facilitate the selection of the correct value for K, it may be made to compensate only for pump and valve leakage, while the effects of motor leakage can be completely nullified by the simple expedient of placing an adjustable by-pass resistance or shunt, between the main and branch lines, just ahead of the two throttles. Since the action of the variator $R_v$ is now modified by the actuator $T_w$ in such a way as to produce a pressure difference between the main and branch lines that is directly proportional to the work resistance, this adjustable resistance may be set to permit a deduction from the main line flow (and thus an addition to the branch line flow) exactly equal to the motor leakage. The resulting flow through $R_m$ and $R_b$, will then remain as if no motor leakage had occurred, and the scale readings of the throttle will accordingly correspond with the feed-rates actually obtained, with adequate accuracy.

In Fig. 14 a short-circuit line 33 extends from the main to the branch-line to carry the increment due to motor leakage to the entry of the branch line resistance $R_b$. In the line 33 is arranged an adjustable resistance G which for each particular machine can easily be regulated so that no more than the increment will flow. The potential drop through the line 33 will, by virtue of the action of the variator $R_v$, vary directly as the work resistance and as the leakage through the motor will likewise vary, the increment thus transferred will correspond with the leakage under all conditions of positive work resistance.

Just as Fig. 7 admits of being condensed in a structural sense into Fig. 10, so likewise certain hydraulic lines, areas and parts may be merged in Fig. 14 to yield the more compact arrangement shown by Fig. 15 in which areas $e'$ and $e$ are replaced by the single area E and area $c$ is found at $c$ merged with one end of the plunger D' which is now of the unbalanced type. Areas $f$, and $g$ and the potential lines 31, 32, 34 and 35 vanish as individual elements. This Fig. 15 relates, as has been mentioned to a positive work resistance.

For a negative work resistance, where leakage is to be compensated for (together with viscosity and work variations) the disclosure will be facilitated by starting with analytical diagram such as Fig. 16.

When the cutter in a milling machine is set to rotate with the work, it no longer opposes the advance of the table but seeks to propel it at its peripheral speed which is considerably in excess of the feed-rates required for tooling operations. It likewise tends to over run the motor which, to prevent, must meet with a high back-pressure of the oil. The control of the speed of the motor is a result of a regulation in the escapement to the reservoir of the oil in the back-pressure line. Whether or not there be much or little leakage in the C D pump and selector valve is of no consequence in this case for the propulsion of the motor is now done mechanically by the table and not by oil sent from the pump.

Such leakage as exists in the motor permits it to be propelled more rapidly under that mechanical urge than does the rate of escapement past the motor throttle of the back-pressure oil. Leakage now exercises an accelerating (instead of a retarding) effect on the feed. To compensate, therefore, an extra resistance must be imposed on the escapement to produce a decrement therein equal to what may be termed the reverse leakage through the motor. Less oil must flow through the motor throttle resistance $R_m$ than normally corresponds to its setting. The pressure on that throttle must be depressed. The pressure on the branch-line throttle must be raised to pass this decrement which amounts to an addition to the pump out-put, and must find its egress through the branch-line.

The arrangement, as will be seen from Fig. 16, comprises the variator $R_n$ formed and connected as heretofore prescribed (see Fig. 12) but in the present case an extra actuator $J_w$, deriving its force-urge from the differential (through lines 36 and 37) across the work resistance, functions in combination with the two regular actuators $J_m$ and J_b which operate, respectively, under the differentials of the throttle resistances R_m and R_b.

The effect of the actuator J_w is to maintain in the branch-line 11 a pressure higher than in the line 18. There need be no short-circuit line such as indicated by 33 in Fig. 15 where the machine is devoted solely to negative work conditions, but that will seldom be the case, for milling machines are readily adjustable for feeding either with or against the cut according to circumstances.

Just as the analytical diagram of Fig. 14 admits of being simplified structurally into the arrangement of Fig. 15, so also may Fig. 16 take form as Fig. 17; the increased area of one piston of the plunger accounting for the small area of the leakage actuator J_w. The short-circuit line 33 has been introduced (with a check-valve Z to render it a "one-way" line) because ordinarily it is desirable that the machine shall admit of use for either taking upward or downward cuts by combining the arrangement of Fig. 15 with that of Fig. 17 to produce what may be termed the universal embodiment shown by Fig. 18. As the latter represents a form highly desirable for practical usage by reason of its ability to compensate for so many likely conditions, certain practical details which have not heretofore, in the interest of lucidity, been referred to in explaining the fundamentals of this invention, can now be mentioned. A flow-switching means, as will be understood, will in most cases be interposed between the motor and the rest of the system for the purpose of stopping or reversing the motor, or of changing its rate from a feed to a quick-traverse; all either manually, or automatically by trip dogs, and in any of the cycles customary with machine tools.

The details of this and the tripping mechanism concern purely mechanical considerations and do not affect the hydraulic characteristics to which the systems as such are devoted. Such mechanisms therefore require no description in detail but for the benefit of those not familiar with the machine tool art, reference is made to British patent of September 15, 1927, No. 297,104. It suffices, accordingly, to indicate such means diagrammatically, and in the following drawings, they are referred to generally by F and in this instance, the part of valve-means which is used to arrest flow to and from the motor (to stop and start it) is indicated by F' and the part of the valve-means which is used to reverse the motor, or change its "feed" to a "quick-traverse" (technically known as a rate change as distinguished from a feed change) is indicated by F'''. This hydraulic switch receives the feed-rate oil from pipe 4 and returns it through pipe 8. It receives the traverse-rate oil from the pipe 30 and returns it through pipe 24. When feeding the oil is switched to enter one or the other of the motor pipes a or b (the QT oil being then by-passed from pipe 30 directly to pipe 24) and the feed oil returns to the valve through the other one of pipes a and b; all according to the direction of motor propulsion.

The quick traverse requires a flow more copious than that usually obtainable from the feed pump, and hence requires an auxiliary pump which need only deliver oil at a relatively low pressure because no cutting takes place during a quick-traverse movement. To this end, for the "make-up" pump T heretofore alluded to may be replaced by one of sufficient capacity and which is indicated on the subsequently referred to figures as QT. Its out-put goes through pipe 30 to the selective valve F'' which, during a feed, simply returns it to the system and (through relief valve r) to the reservoir. But, when used for rapidly shifting the table, the valve means F'' sends this copious flow first to the motor. To avoid breakage, in case of untoward table arrestment, an emergency valve J with a by-pass 29 to reservoir, is advisably introduced.

Fig. 19 shows the same structural arrangement as Fig. 18 but with the cutter taking a "hook-in" cut and producing a negative work resistance. In this case, the variators have automatically assumed positions different from those shown in Fig. 18 (where the work resistance is positive) and the check-valve Z has closed to prevent any flow from the branch to the main line.

The progression from the elementary system from Fig. 3 to Figs. 18 and 19, having been illustrated and explained in detail, it will be understood that this invention contemplates a corresponding family of systems similarly derived from Figs. 1, 2 and 4; the series culminating in the arrangement shown by Fig. 20 which embodies additional improvements.

The system of Fig. 20 is the one we are disposed to prefer for milling-machine usage although it may be stated that the system of Figs. 18 and 19 also exhibits characteristic advantages.

Through the pipe 26, the quick-traverse pump QT draws oil from the reservoir A. When used for effecting a rapid traverse, all this oil enters the system through the pipe 40 and the proportion not being then returned to the reservoir by the C D pump goes through the pipe 30 to the selector valve F'' which diverts it to either pipe p or q (as the direction may be) and it then passes through the stop valve F' and enters the motor through one or the other of pipes a and b. It returns through others of these pipes and is discharged to the reservoir through the pipe 41 and a low-resistance relief-valve 42.

During tooling operations, the proportion not used by the C D pump is by-passed as shown by 43 by the selector valve F'' and returned to the reservoir, or in certain positions of that valve can return directly to the reservoir through the pipes 25 and 27' which lead to and from the low pressure relief valve r''.

The intake oil supplied to the C D pump is in this particular arrangement derived chiefly from line 13, which carries the oil displaced by the motor through the return lines 8 and 18, together with the fraction passing the shunt throttle R_b; but if, or whenever, such flow should be insufficient, then will the "make-up" oil be supplied through the line 17 from the QT pump. Inasmuch as a differential type of motor is here indicated, during its travel in one of its alternate directions, a surplus will come from the pipe 13, and the excess will back-flow through the pipe 17, as will be understood.

A constant volume will be drawn at all times by the C D pump through the line 47 in which there is shown an oil-filter 48 and the filtered oil enters the pipe 2 and goes directly through the passages 9 and 12 of the resistances R_m and R_b of the dual throttle. An advantage may here be noted in respect to the fact that a single filter serves for both resistances and, as the latter both derive their oil from a single line, it enters each resistance at the same temperature.

It is usual, in hydraulic machines, to use the pressure available for operating auxiliary mechanism such as valve shifters. These require but little oil and for that purpose a branch pipe 49 leads from the pipe 2 to the point of usage. For the auxiliary mechanism always to be available, it is necessary that some sufficient pressure be maintained in the auxiliary line. To that end a relief-valve is interposed in the outlet line 2. When the operating conditions are such that the load imposed on the motor creates a pressure ahead of the throttle insufficient to serve as a means to operate the auxiliary mechanism—such as, for instance, when idling (or when taking a "hook-in" cut so as to produce negative work resistance) the relief valve will build up a pressure high enough for this purpose. Whenever the positive work resistance is great enough to build up a pressure higher than the setting of the relief valve, the latter will be pushed back against the spring, until it offers no further resistance to flow. As it is also desirable that the system shall embody an emergency relief-valve, it is convenient to combine these, say in the form shown by E' where a light spring 50 permits the plunger 51 to retreat enough to permit the out-put of the pump to flow to the throttles, while a relatively heavy spring 52 permits the plunger (under any undue pressure) to open the port leading to the escape pipe 29.

From the resistance $R_m$, the oil flows through pipe 4 to the selector valve F'' which switches it into one or the other of pipes $p$ and $q$ and thence to and through the motor; returning through pipe 8 to and through the variator $R_n$ which, as will be remembered from the preceding explanation, presents no resistance when the cutter C is creating a positive work resistance, but which during a negative work resistance interposes a resistance determined by balancing the differential of the shunt resistance $R_b$ against that of the series resistance $R_m$ augmented for pump and valve leakage by a component of the motor pressure differential. This component is determined by excess in magnitude of the areas $u$ and $v$ over the areas $w$ and $x$ as has already been fully explained in connection with the preceding figures. Area $u$ is subjected to the forward pressure in line 4 through the pressure line 20; areas $v$ and $w$ to the back-pressure on the motor through line 8; and area $x$ to the pressure in the line 18 which at all times carries such oil as is being exhausted from the motor. If the motor used be of the non-differential type, the quantity will correspond with that delivered to the motor from line 4. If it be of the differential type, as shown, it will be somewhat greater or less (according to the direction of propulsion of the motor) by an amount equal to the displacement of the piston rod of the motor.

This motor discharge, merges at 10 with the fraction of the C D pump out-put which first passes the throttle resistance $R_b$ and then through pipe 5 flows to and through the shunt variator $R_v$ which presents a regulating resistance during a positive work resistance and reduces that resistance to zero during a negative work resistance. This regulating resistance is determined by balancing the differential of the shunt resistance $R_b$ against the series resistances $R_m$ augmented for leakage correction by a component of the work resistance determined by the magnitude of the areas $s$ and $t$ over the areas $y$ and $z$. Area $s$ is subjected to the forward pressure in line 4 by the pressure line 44; areas $t$ and $y$ to the back-pressure on the said motor through the pressure line 45; and area $z$ to the pressure of the oil from the shunt resistance $R_b$. The shunt flow past and from the variator $R_v$ enters the pipe 11 and at 10 merges with that from the motor; the combined flow passing the fixed resistance $R_c$ and going through the discharge line 13 to the junction 46 where it supplies the constant volume drawn by the C D pump, the residual volume (if any) continuing through line 17 to the reservoir together with the large volume of the QT pump with which it combines at 22.

In the case of a positive work resistance, the extra oil required to make-up for motor slippage is diverted to the forward side by the short-circuit line 33 with its adjustable resistance G. In connection with Figs. 18 and 19 there was shown in this line a check-valve Z for preventing any reverse flow during a negative work resistance, but as its presence is a matter of preference in either case, it has not been depicted in the case of Fig. 20. A close analysis of the hydraulic action of our general system, whether in the form with the throttles ahead, or behind the motor, shows that the compensation for leakage is more accurately accomplished, especially for the higher feed rates, when a check-valve is employed than when omitted. On the other hand, when omitted, heavy loads produce a much lower percentage change in the lower feed rates, and inasmuch as the absence of such a check-valve has the effect of over-compensation, it will be seen that a given machine will approach closer compensation as a result of its normal wear.

Having thus revealed this invention, we claim as new and desire to secure the following combinations and elements, or equivalents thereof, by Letters Patent of United States:—

1. An hydraulic system combining a volumetrically-constant source of oil; a main-conduit leading therefrom; an hydraulic-motor in said main-conduit; a shunt-conduit; throttle means connecting the conduits with said source for apportioning the flow through said main-conduit and said shunt-conduit and means in said shunt-conduit to impose a resistance to the flow therein to maintain the oil in each conduit under substantially equal pressures at the down stream side of said throttle means.

2. An hydraulic system combining in serial relation a motor, a selective throttle and a variable throttle; a normally fixed resistance in shunt relation with said elements; said variable throttle being provided with areas subjected to opposing influences of the pressures at the selective throttle and the normally fixed resistance respectively; a pump; and piping therefrom for conducting one fraction of its output through said serially related elements and the remaining fraction through said shunt resistance.

3. An hydraulic system combining a leaky motor; a source of fluid; a conduit therebetween; a branch conduit connected with said conduit between said motor and said source; means for selecting the rate of said motor; and means cooperating therewith automatically responsive to variations in the pressure ahead of and behind said motor for transmitting to said motor an amount of fluid sufficient to compensate the leakage in said motor and maintain it at its selected rate, and for diverting through said branch conduit the excess fluid from said source.

4. A milling machine combining a cutter and a pump, both power-driven; a work-carrying table; an hydraulic motor connected to propel said table; a reservoir; a flow-switching and bypassing instrumentality between said pump and reservoir and motor; a feed-rate selecting throttle; a main conduit line connecting the aforesaid hydraulic elements; a shunt conduit line from said pump to said reservoir; a selective throttle in said shunt-line; two pressure-regulating valves, the one intervening in the shunt-line between the pump and reservoir, and the other intervening in the main-line between the motor and the reservoir; opposing hydraulic-actuators for automatically determining the orificial resistance of each valve; and pressure-line connections rendering said opposing actuators equally responsive to the pressure-drops across said throttles.

5. An hydraulic system combining a constant volume pump; a leaky motor subject to a negative work-resistance; a rate determiner for said motor; a device for creating a greater back than forward pressure to prevent motor over-run; and means for regulating said device to maintain a pressure differential sufficient to nullify the effect of the motor leakage.

6. A milling machine combining a cutter and a pump, both power-driven; a work-carrying table; an hydraulic motor connected to propel said table; a reservoir; a flow-switching and by-passing instrumentality between said pump and reservoir and motor; a feed-rate selecting throttle; a main conduit line connecting the aforesaid hydraulic elements; a shunt conduit line from said pump to said reservoir; a selective throttle in said shunt-line; two pressure-regulating valves, the one intervening in the shunt-line between the pump and reservoir, and the other intervening in the main-line between the motor and the reservoir; opposing hydraulic actuators for automatically determining the orificial resistance of each valve; and pressure-line connections rendering said opposing actuators equally responsive to the pressure-drops across said throttles, and one of the actuators of each set responsive to the pressure differential created across the motor by the direction and magnitude of the work-resistance.

7. An hydraulic system combining a constant volume pump; a main and a branch conduit line therefrom; a leaky motor in the main line; a rate-indicating throttle-means for primarily determining the division of flow through said lines; and auxiliary throttle-means for automatically regulating the pressures effective on said first-mentioned throttle-means, said auxiliary means acting under the influence of the pressure differential across said motor created by positive or negative work-resistance encountered thereby.

8. In an hydraulic system, an hydraulic motor; a conduit connected therewith; a valve in said conduit for presenting resistance to the flow therethrough; plunger means associated with said valve for determining the extent of its closure, said plunger means embodying opposing areas of different magnitude; and pressure connections from points in said conduit ahead of the motor and behind the said valve for subjecting said areas to hydraulic pressures.

9. A milling machine combining a cutter and a pump, both power-driven; a work-carrying table; an hydraulic motor of the differential type connected to propel said table; a reservoir; a flow-switching and by-passing instrumentality between said pump and reservoir and motor; a feed-rate selecting throttle; a main conduit line connecting the aforesaid hydraulic elements; a shunt conduit line from said pump to said reservoir; a selective throttle in said shunt-line; means for simultaneously and conversely shifting said throttles; two pressure-regulating valves, the one intervening in the shunt-line between the pump and reservoir, and the other intervening in the main-line between the motor and the reservoir; two opposing hydraulic-actuators for automatically determining the orificial resistance of each valve; and pressure-line connections rendering said opposing actuators equally responsive to the pressure-drops across said throttles.

10. A milling-machine combining a cutter and a pump, both power-driven; a work carrying table; an hydraulic motor of the differential type connected to propel said table; a reservoir; a flow-switching and by-passing instrumentality between said pump and reservoir and motor; a feed-rate selecting throttle; a main conduit line connecting the aforesaid hydraulic elements; a shunt conduit line from said pump to said reservoir; a selective throttle in said shunt-line; means for simultaneously and conversely shifting said throttles; two pressure-regulating valves, the one intervening in the shunt-line between the pump and reservoir, and the other intervening in the main-line between the motor and the reservoir; two opposing hydraulic-actuators for automatically determining the orificial resistance of each valve; and pressure-line connections rendering said opposing actuators equally responsive to the pressure-drops across said throttle, and one of the actuators of each set being larger than its companion and connected to be responsive to the pressure differential created across the motor by the direction and magnitude of the work-resistance.

11. An hydraulic system for propelling a motor against variable loads, combining a volumetrically constant source of oil; a conduit leading therefrom forking into two branches, one of said branches being adapted to be connected with said motor; means for throttling the flow of oil in the said branches decrementally and incrementally respectively; and means for maintaining the pressure of the oil in the respective branches on the down stream side of said throttling means substantially equal irrespective of the variations in load upon the said motor and its effect upon the pressure in the work branch.

12. An hydraulic system combining a volumetrically constant source of oil; a motor adapted to be subjected to variable loads; a main conduit leading from said source and connected with said motor; a normally open auxiliary conduit connected with said main conduit intermediate said motor and said source; valve means having an orifice variable as to size in each of said conduits for imposing a normally constant resistance upon the flow in each conduit; means for inversely adjusting the size of said valve orifices thereby to vary the rate of movement of said motor; and auxiliary valve means for maintaining the pressure of the oil in each conduit on the downstream side of said orifices substantially equal irrespective of variations in load upon said motor or variations in size of the valve orifices.

13. An hydraulic system combining a source of oil; a conduit leading therefrom and dividing into a work branch and an idle branch; means for compensating for changes in the viscosity of the oil in the work branch comprising valve means in each branch for imposing a normally constant resistance to the flow of oil therein, and auxiliary valve means in the idle branch having piston areas subjected to the opposed influence of the pressure differentials across the valve means in each branch for maintaining substantially equal pressures at the valve means in the respective branches.

14. In a system having a volumetrically constant source of oil for propelling an hydraulic motor at a rate corresponding to a given setting of a throttle irrespective of changes in work-resistance and/or viscosity of the oil the combination of a main and auxiliary conduit connected with said source; an hydraulic motor and a throttle in the main conduit; a variable resistance and a throttle in the auxiliary conduit; and means for automatically varying the variable resistance to maintain across it pressure drop equal to that created across the motor by the work-resistance, comprising a valve element and a plunger element having areas thereof connected with and responsive to the opposed influence of the pressure differentials across said throttles and across said motor for actuating the valve element.

HANS ERNST.
BERNARD SASSEN.